United States Patent [19]

Chang

[11] Patent Number: 5,542,163
[45] Date of Patent: Aug. 6, 1996

[54] ELECTRICALLY-CONDUCTING ADHESION-PROMOTER

[76] Inventor: On K. Chang, 1031 Belvedere La., San Jose, Calif. 95129

[21] Appl. No.: 285,753

[22] Filed: Aug. 3, 1994

Related U.S. Application Data

[63] Continuation of Ser. No. 49,196, Apr. 19, 1993, abandoned.

[51] Int. Cl.$^6$ .................................................. H01H 4/04
[52] U.S. Cl. ............................ 29/2; 429/215; 429/233; 429/245; 29/623.4; 29/623.5; 427/486
[58] Field of Search ...................... 427/207.1, 486; 429/142, 245, 233, 215, 217; 29/2, 623.4, 623.5

[56] References Cited

U.S. PATENT DOCUMENTS

| | | |
|---|---|---|
| 4,091,176 | 5/1978 | Alfenaar .................................... 429/40 |
| 4,214,969 | 7/1980 | Lawrance . |
| 4,416,915 | 11/1983 | Palmer et al. . |
| 4,565,751 | 1/1986 | Faust et al. ................................ 429/94 |
| 4,772,517 | 9/1988 | Muenstedt et al. . |
| 4,824,745 | 4/1989 | Ogawa et al. ........................... 429/213 |
| 4,925,751 | 5/1990 | Schackle et al. ....................... 429/191 |
| 5,108,855 | 4/1992 | Daifuku et al. . |
| 5,232,746 | 8/1993 | Blädel et al. ............................ 427/470 |

FOREIGN PATENT DOCUMENTS

| | | |
|---|---|---|
| 1264804 | 1/1990 | Canada . |
| 62-160656 | 7/1987 | Japan . |
| 62-16056 | 12/1987 | Japan . |

*Primary Examiner*—M. Nuzzolillo

[57] ABSTRACT

Disclosed are methods for enhancing the adhesion of composite electrodes onto metal foils (i.e., current collectors), to metal foils prepared by these methods and to electrolytic cells produced from these metal foils.

21 Claims, No Drawings

ELECTRICALLY-CONDUCTING ADHESION-PROMOTER

This application is a continuation of application Ser. No. 08/049,196, filed Apr. 19, 1993, now abandoned.

BACKGROUND OF THE INVENTION

1. Field of the Invention

This invention is directed to methods for enhancing the adhesion of composite electrodes onto metal foils (i.e., current collectors), to metal foils prepared by these methods and to electrolytic cells produced from these metal foils.

2. State of the Art

Electrolytic cells comprise a cathode, an anode and an electrolyte interposed therebetween. Electrolytic cells are often defined as liquid or solid cells and this refers merely to whether the electrolyte interposed between the anode and the cathode is a liquid or a solid. Solid electrolytic cells are well known in the art and present many advantages over conventional liquid batteries such as improved safety features, lighter weight, etc.

In order to enhance the overall current produced by solid or liquid batteries, it is conventional to employ several electrolytic cells in a battery. When so employed, the current from each of the cells is accumulated so that the total current generated by the battery is roughly the sum of the current generated from each of the individual electrolytic cells employed in the battery.

One method for accumulating the current from individual electrolytic cells is by using a current collector attached to the cathode or the anode of the electrolytic cell. Typically, the current collector is a metal foil which is coupled to other current collectors in the battery so that the current generated by each cell is collected and accumulated over all of the cells. Thus, the total current generated by the battery is approximately a summation of the current generated by each of the electrolytic cells employed in the battery.

Notwithstanding the benefits of using current collectors (i.e., metal foils) in electrolytic cells, there is a problem when current collectors are used in conjunction with composite electrodes (i.e., electrodes derived from a composite of different materials). Specifically, composite electrodes are typically prepared from a paste which is applied onto the surface of the current collector and then cured to form the electrode.

For example, one conventional method for forming a composite cathode is by first forming a cathode paste comprising a compatible cathodic material (e.g., $LiV_3O_8$, $V_6O_{13}$ and the like), a conductive material such as carbon powder, an electrolytic solvent, and a prepolymer or a mixture of prepolymers. The cathode paste is then coated at a set thickness by extrusion or other suitable application means onto a metal foil which acts as a current collector and the paste is then cured to provide for a solid cathode having a current collector attached to one of its surfaces.

However, the metal foils used as current collectors (e.g., aluminum foil, nickel foil, etc.) typically lack adequate adherence so as to permit a paste to adequately adhere to the foil. Thus, during application of a paste onto the foil, the paste can become dislodged from the foil. In turn, after curing, such dislodgement will result in defects in collecting current from that cell.

One method disclosed in European Patent Application Publication No. 0 397 523 ("EPA '523") for overcoming the inadequate adherence of metal foils to an electrode paste is to roughen the surface of the metal foil with electrolytically deposited metal. The electrolytically deposited metal "roughens" the surface of the foil and one commercially employed current collector is a roughened nickel on nickel current collector which is available as CF18/NiT from Fukuda Metal Foil & Powder Company, Ltd., Kyoto, Japan. The electrolytic deposition process results in the formation of a roughened surface characterized on a microscopic level by peaks and valleys rather than a smooth planar surface (see FIGS. 3, 4 and 6 of EPA '523). Such roughened surfaces lead to a more adherent surface.

On the other hand, roughened metal on metal foils are rather expensive and result in undesirable weight increases for the metal foil current collector which translates into an undesirable increased weight for electrolytic cell itself. Moreover, electrolytic deposition of metal is not practical for certain metal foils. For example, aluminum foil typically contains an outer passivation layer of aluminum oxide which inhibits the electrolytic deposit of aluminum onto the surface of the aluminum foil.

Another common method in the art for coating a metal foil with carbon is to paint the metal foil with a carbon-containing paint. After painting, the solvent in the paint has to be dried out before the coated foil can be used. Thus, this type of process has the disadvantage of being slow and also of being difficult to consistently apply an even layer of electrically-conducting, adhesion promoter over the surface of the metal foil.

SUMMARY OF THE INVENTION

This invention is directed to the novel and surprising discovery that the surface of metal foils can be modified to be more adherent to an electrode paste by placing a layer of an electrically-conducting adhesion-promoter onto the surface of the metal foil. The electrically-conducting adhesion-promoter is a solid polymeric layer which comprises an adhesion-promoting polymer and an effective amount of a conductive material so as to render this layer conductive.

Surprisingly, the inclusion of an effective amount of a conductive material such as carbon powder in an adhesion-promoting polymer to form an adhesion-promoting polymeric layer provides suitable conductivity and enhanced adherence of this layer to the metal foil.

In view of the above, in one of its composition aspects, this invention is directed to a metal foil containing on one of its surfaces a layer of an electrically-conducting adhesion-promoter comprising carbon powder and a compatible adhesion-promoting polymer wherein the electrically-conducting adhesion promoter is applied onto the metal foil by creating an electrostatic flux sufficient to attract the electrically-conducting adhesion-promoting material to the surface of the metal foil.

In another of its composition aspects, this invention is directed to an electrode/current collector composite comprising:

a metal foil suitable for use as a current collector;

a layer of a solid electrically-conducting, adhesion promoter formed on at least one surface of the metal foil which comprises a carbon powder and an adhesion-promoting polymer; and a composite electrode wherein the electrically-conducting adhesion-promoter layer is formed on the surface of the metal foil through application of an electrostatic flux.

In another of its composition aspects, this invention is directed to an electrolytic cell comprising:

a metal foil suitable for use as a current collector;

a layer of a solid electrically-conducting, adhesion promoter formed on at least one surface of the metal foil which comprises a carbon powder and an adhesion-promoting polymer wherein the electrically-conducting adhesion-promoter layer is formed through application of an electrostatic flux;

a composite cathode;

an electrolyte; and an anode;

wherein the layer of said solid electrically-conducting, adhesion promoter is interposed between the metal foil and the composite cathode and further wherein the electrolyte is interposed between the composite cathode and the anode.

In one of its method aspects, this invention is directed to a method for modifying the surface of a metal foil current collector to render it more adherent to a composite electrode. In particular, the method comprises:

(a) selecting a metal foil suitable for use as a current collector; and (b) electrostatically applying a layer of an electrically-conducting adhesion-promoter onto at least one surface of said foil, which layer comprises a carbon powder and an adhesion-promoting polymer.

The electrolyte employed in the electrolytic cell is either a liquid or solid electrolyte but preferably is a solid electrolyte.

Preferably, the layer of solid, electrically-conducting, adhesion-promoter is no more than 100 microns (μm) in thickness and more preferably is from about 100 Angstroms to about 20 μm in thickness and even more preferably is from about 0.1 μm to about 10 μm in thickness.

DETAILED DESCRIPTION OF THE PREFERRED EMBODIMENTS

As noted above, this invention is directed, in part, to metal foil current collectors which have been modified so as to improve their adherence properties to a composite electrode. However, prior to describing this invention in further detail, the following terms will first be defined.

Definitions

As used herein, the following terms have the following meanings.

The term "metal foil" refers to any metal foil or metal alloy foil which can act as a current collector in an electrolytic cell. Suitable metal foils or metal alloy foils are well known in the art and include, by way of example, aluminum foil, nickel foil, copper foil, stainless steel foil and the like.

The metal foil can be continuous and cover the entire surface of the current collector or noncontinuous and not cover the entire surface of the current collector. Examples of non-continuous current collectors include non-conductive plastics having metal foil tabs inserted therein wherein these tabs act as the current collector. Such non-continuous current collectors are lighter in weight than continuous metal foil current collectors and, accordingly, are of use where the weight of the battery is of concern.

The term "inorganic ion salts" refers to those salts wherein the cation of the salt is an alkali metal or an alkaline earth metal selected from the group consisting of lithium, sodium, potassium, rubidium, cesium, magnesium, calcium, and the like, which salts are suitable for use in the electrolyte and composite electrodes of the electrolytic cell. The particular inorganic ion salt employed is not critical and examples of suitable salts include, by way of example, $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$, and the like. The cationic portion of the inorganic ion salt is preferably an alkali metal selected from the group consisting of lithium, sodium, potassium, and cesium and most preferably is lithium.

The term "electrolytic solvent" refers to the solvent added to the composite electrode and the electrolyte for the purpose of solubilizing inorganic ion salts during operation of the electrolytic cell. When the electrolyte is a solid, the electrolytic solvent can further act as a plasticizer. The solvent can be any low volatile aprotic polar solvent. Preferably, these materials are characterized by a boiling point greater than about 85° C. In this regard, low volatility for the electrolyte solvent simplifies manufacture of the electrolyte/batteries and improves their shelf-life.

If the solid matrix forming monomer or partial polymer thereof employed in either a solid solvent-containing electrolyte or the composite electrode (cathode or anode) is cured or further cured by radiation polymerization to form the solid matrix, then the solvent should be radiation inert at least up to the levels of radiation employed. If the solid matrix forming monomer or partial polymer thereof is cured or further cured by thermal polymerization, then the solvent should be thermally inert at least up to the temperatures of thermal polymerization. Additionally, the solvent should not scavenge free radicals.

Representative examples of suitable electrolytic solvents include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like, and mixtures thereof. A preferred solvent is a mixture of an organic carbonate and triglyme, with a 4:1 weight ratio mixture of propylene carbonate:triglyme being particularly preferred, as disclosed in U.S. patent application Ser. No. 07/918,509 filed as Attorney Docket No. 028574-026 and entitled "SOLID, SOLVENT-CONTAINING ELECTROLYTES AND ELECTROLYTIC CELLS PRODUCED THEREFROM" which application is incorporated herein by reference in its entirety.

The term "electrolytic cell" refers to primary and secondary electrolytic cells comprising an anode, a cathode, and an ion-conducting electrolyte interposed therebetween. The ion-conducting electrolyte can be either a liquid or a solid electrolyte but solid electrolytes are preferred and more preferably, the electrolytic cell is a solid secondary cell.

The anode is typically comprised of a compatible anodic material which is any material which functions as an anode in an electrolytic cell. Such compatible anodic materials are well known in the art and include, by way of example, lithium, lithium alloys, such as alloys of lithium with aluminum, mercury, zinc, and the like, and intercalation based anodes such as carbon, tungsten oxides, and the like.

The cathode comprises a compatible cathodic material which refers to any material which functions as a positive pole (cathode) in an electrolytic cell. Such compatible cathodic materials are well known in the art and include, by way of example, manganese dioxide, molybdenum trioxide, vanadium oxides such as $V_2O_5$, $V_6O_{13}$, $LiV_3O_8$ and the like, sulfides of titanium, molybdenum, niobium, and the like, chromium oxide, copper oxide, $LiCoO_2$, $LiMnO_2$, etc. The particular compatible cathodic material employed is not critical. When the electrolytic cell is a secondary cell, then the compatible cathodic material employed is one which is capable of being recharged (e.g., $LiV_3O_8$, $V_6O_{13}$, $MoO_3$, and the like).

The term "composite electrode" refers to cathodes and anodes wherein the cathode is comprised of materials other than compatible cathodic materials and the anode is comprised of materials other than compatible anodic materials. Typically, the composite contains a polymer which acts to bind the composite materials together. This polymer is derived from a solid matrix forming monomer or partial polymer thereof.

Composite cathodes are well known in the art. For example, a composite cathode can comprise a compatible cathodic material, a conductive material, an electrolytic solvent, an inorganic ion salt, and a solid polymeric matrix which is derived from a solid matrix forming monomer or partial polymer thereof.

Composite anodes are also well known in the art. For example, a composite anode can comprise a compatible intercalation anodic material, an electrolytic solvent and a solid polymeric matrix which is derived from a solid matrix forming monomer or partial polymer thereof.

The term "solid polymeric matrix" or "solid matrix" refers to an electrolyte and composite electrode compatible material formed by polymerizing an inorganic or organic monomer (or partial polymers thereof) and which, when used in combination with the other components of the electrolyte or composite electrode, renders the electrolyte or composite electrode solid. The solid matrix may or may not be ion-conducting. Preferably, however, the solid matrix is capable of ionically conducting inorganic cations (e.g., alkali ions). When employed to form the electrolyte or the composite electrode, the solid matrix forming monomer is preferably polymerized in the presence of the inorganic ion salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical.

Preferably, the solid matrix forming monomers contain hetero atom functionalities capable of forming donor acceptor bonds with the cations of the inorganic ion salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine

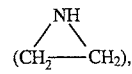

ethylene oxide

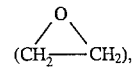

epichlorohydrine

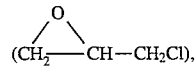

acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253 and incorporated herein by reference), acrylic acid ($CH_2$=CHCOOH), chloroacrylic acid (ClCH=CHCOOH), bromoacrylic acid (BrCH=CHCOOH), crotonic acid ($CH_3$CH=CHCOOH), propylene ($CH_3$CH=$CH_2$), ethylene ($CH_2$=$CH_2$) and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et at., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of the inorganic ion salt and the electrolytic solvent so as to form solid polymeric matrices which are suitable for use as solid electrolytes or electrode composites in electrolytic cells.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones.

Methodology

The layer of electrically-conducting adhesion-promoter applied to the surface of the metal foil is comprised of a carbon powder and an adhesion-promoting polymer.

Carbon powder itself is well known in the art. The term "carbon powder" is intended to include carbon in the form of powder, flakes, beads, fibers or the like. Several well known forms of carbon powder include, e.g., graphite, carbon black, acetylene black, furnace black, etc. Exemplary furnace black includes marketed products such as KETJEN BLACK EC (Trademark of Akzo in Holland), ASAHI HS-500 (Trademark of Asahi Carbon in Japan) and VULCAN XC-72 (Trademark of Cabot in USA).

As indicated above, the carbon powder comprises particulate carbon in any number of forms. It is preferred, however, that the particulate carbon be very finely divided, e.g., particulates having a size of finer than about 0.3 microns. It is more preferred, however, that the size of the carbon particulates range from about 5 to about 200 nanometers. In practice, the carbon particulates can be expected to contain agglomerates composed of these fine particles.

It is particularly preferred according to the invention that the carbon powder have a high conductivity. For example, it is preferred that the carbon powder have a bulk conductivity greater than about 10 S cm$^{-1}$, and more preferably greater than about 20 S cm$^{-1}$ measured under a pressure of 50 MPa (7097 psi).

The amount of carbon powder present in the electrically-conducting, adhesion-promoting layer is preferably sufficient to impart suitable conductivity to the electrically-conducting, adhesion-promoting layer yet not so high as to destroy the flowability, mechanical strength, and/or adhesion of the adhesion-promoting layer. Consequently, the amount of carbon powder in the electrically-conducting, adhesion-promoting layer typically ranges from about 1 percent by weight to about 30 percent by weight. It is preferred that the weight percent of carbon powder range from about 5 percent to about 20 percent, and more preferably from about 7 percent to about 15 percent.

The electrical conductivity of the adhesion-promoting layer can be modified according to the carbon content, the type of adhesion-promoting polymer employed and/or by the addition of other conductive fillers. Other conductive fillers include, for example, at least one of the following materials: silver, copper, gold, aluminum, nickel, palladium, iron, stainless steel, tin oxide, indium oxide, lead oxide, silicon carbide, zirconium carbide, titanium carbide graphite, or the like. Although suitable electrical conductivity can be provided strictly through the use of carbon powder, the other conductive fillers can be used is varying amounts as desired without affecting the nature of the invention.

The through-the-layer electrical conductivity of the adhesion-promoting layer is generally greater than about 0.2 S cm$^{-2}$, preferably greater than about 0.5 S cm$^{-2}$, and more preferably greater than about 1 S cm$^{-2}$. Through-the-layer electrical conductivity is the conductance measured through a unit surface area without regard to the thickness of the layer.

In order to provide suitable adhesion, the carbon powder is mixed with an adhesion-promoting polymer. Adhesion-promoting polymers are well known in the art and include at least the following: styrene-based polymers and copolymers; synthetic rubbers and their derivatives, as well as reclaimed rubbers; thermoplastics such as cellulose derivatives, vinyl polymers and copolymers, polyesters, polyacrylates, polyethers and polysulphones; and thermosetting resins such as amino plastics, epoxides, polyesters, polyaromatics, furanes, and phenolic resins or modifications thereof. A few preferred examples of adhesion-promoting polymers include styrene/acrylate polymer, styrene/butadiene copolymer, polyethylene, ethylene/vinyl acetate copolymer, polyisobutylene, polyester, and the like.

It is also possible according to the invention to modify the conductivity of the electrically-conducting, adhesion promoter by employing adhesion-promoting polymers having varying degrees of conductivity, i.e., conductive polymers such as those characterized by a conjugated network of double bonds like polypyrolle, polyaniline, polythiophene, and polyacetylene, and the like.

Prior to application to the surface of the metal foil, the carbon powder and adhesion-promoting polymer can be colloidally suspended in a liquid vehicle. Alternatively, the carbon powder and the adhesion-promoting polymer can be applied as a homogenous powder wherein the carbon powder and the polymer are thoroughly mixed to provide for homogeneity.

When a liquid vehicle is employed, the particular vehicle employed is not critical and the vehicle may consist of, e.g., a petroleum distillate, freon, and any other non-conducting liquid (i.e., having a conductivity of less than $10^{-4}$ S cm$^{-1}$) having a low viscosity (i.e., having a viscosity of less than about 5 centipoise at 25° C.) and which is capable of reasonably rapid evaporation (e.g., typically having a boiling point of less than about 120° C.). The carbon powder and the adhesion-promoting polymer are typically employed at from about 3 to about 30 weight percent based on the weight of the liquid vehicle.

The electrically-conducting, adhesion promoter is formed on the surface of the metal foil in substantially the same way that toner is applied to a paper substrate in a photocopy machine. For example, the metal foil or the substrate onto which the metal foil has been attached is treated so as to impose a negative charge across the surface thereof. The negatively charged region of the metal foil and/or substrate material will tend to induce a positive charge in the portion of an intensification electrode which is directly opposite the surface of the metal foil. This creates lines of electrostatic flux which extend essentially perpendicular to the surface of the metal foil and represents a force field capable of acting on positively charged particles such as toner or other carbon-containing materials which are colloidally suspended in a liquid vehicle. The positively charged carbon-containing material is attracted to the surface of the metal foil along the lines of the electrostatic flux. At the surface of the metal foil, the positively charged carbon-containing material tends to neutralize the negative charge on the surface of the metal foil thus creating a layer of an electrically-conducting adhesion promoter.

After application and if necessary, the layer of electrically-conducting, adhesion promoter is treated to convert this layer to a solid. Such conversion is accomplished by reference to the layer applied. For example, if the layer contains a polymer in solution, then the conversion includes an evaporation step wherein the solvent is removed so as to provide for the solid, electrically-conducting, adhesion-promoting layer. Contrarily, when a solid, homogeneous mixture of carbon powder and adhesion-promoting polymer is applied onto the surface of the foil by electrostatic flux, the resulting solid, electrically-conducting, adhesion-promoting layer is formed by heating to a temperature sufficient to melt the polymer so as to provide adhesion to the foil upon cooling.

The resulting solid electrically-conducting adhesion-promoting layer preferably has a thickness of from at least one molecule to no more than about 100 μm. More preferably, this layer has a thickness of from about 100 Angstroms to about 20 μm in thickness and even more preferably from about 0.1 μm to about 10 μm in thickness.

After formation of the solid electrically-conducting, adhesion-promoter layer on the surface of the current collector, a composite electrode is then applied thereto. The electrode is typically prepared from an electrode paste. For example, a cathodic paste can be prepared from a cathode paste which comprises:

from about 35 to 65 weight percent of a compatible cathodic material;

from about 1 to 20 weight percent of a conductive material;

from about 0 to 20 weight percent of a polyalkylene oxide film forming agent comprising repeating units of

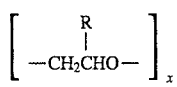

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000;

from about 10 to 50 weight percent of electrolytic solvent; and from at least about 5 weight percent to about 30 weight percent of a prepolymer, wherein all weight percents are based on the total weight of the cathode.

Suitable conductive materials include by way of example, carbon powder, graphite, powdered nickel, metal particles, conductive polymers (i.e., characterized by a conjugated network of double bonds like polypyrole, polyaniline, polythiophene, and polyacetylene), and the like.

Suitable prepolymers are well known in the art and are described above.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES", which application is incorporated herein by reference in its entirety.

The electrolytic solvent employed in the cathode paste is not critical but preferably is a 10:1 to 1:2 weight ratio mixture of ethylene and/or propylene carbonate to triglyme. Preferred mixtures include a 4:1 weight ratio mixture of ethylene and/or propylene carbonate to triglyme and a 1:1 weight ratio mixture of ethylene and/or propylene carbonate to triglyme. See, for example, U.S. Ser. No. 07/918,509 filed Jul. 22, 1992 which is incorporated herein by reference in its entirety.

Composite anodes can also be prepared following procedures similar to that employed in preparing composite cathodes. Composite anodes typically comprise from about 1 to about 20 weight percent of a conductive material, from about 35 to about 60 weight percent of a compatible anodic material, from about 10 to about 50 weight percent of an electrolytic solvent and from about 5 to about 30 weight percent of a prepolymer, all based on the total weight of the anode.

As described above, the electrode paste (i.e., the cathode or anode paste) is then applied onto the surface of the layer of electrically-conducting adhesion-promoter which, in turn, is found on the surface of a metal foil. The electrode paste is then cured to provide for the solid electrode.

When the electrode paste is a cathode paste, it is preferably applied onto the layer of electrically-conducting adhesion-promoter at a rate to give, after curing, a substantially uniform coating thickness of from about 20 to about 150 microns. Similarly, when the electrode paste is an anode paste, it is preferably applied onto the layer of electrically-conducting adhesion-promoter at a rate to give, after curing, a substantially uniform coating thickness of from about 20 to about 150 microns.

Curing is generally accomplished by conventional techniques to form a solid electrode. For example, suitable curing methods include heating, irradiation with electron beams (EB), etc. When the composition is cured by heating, the composition preferably contains an initiator. For example, heat curing initiators are typically peroxides such as benzoyl peroxide, methyl ethyl ketone peroxide, t-butyl peroxypyruvate, diisopropyl peroxycarbonate, and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In either case, the resulting cured electrode is a solid, homogeneous, single-phase material which is maintained upon curing, and does not readily separate upon cooling to temperatures below room temperature. See, for example, U.S. Pat. No. 4,925,751 which is incorporated herein by reference in its entirety.

Accordingly, the resulting product is a composite containing a metal foil which functions as a current collector, a layer of electrically-conducting adhesion-promoter, and a composite electrode (i.e., a composite cathode or composite anode) wherein the layer of electrically-conducting adhesion-promoter is interposed between the metal foil and the electrode.

As an additional matter, it is sometimes desirable to avoid the use of any protic materials which will be incorporated into the electrolytic cell. Such materials can be removed from the components of the electrolytic cell by conventional methods. For example, most of the protic inhibitors in di- and triacrylate prepolymers as well as in the urethane acrylate prepolymers are preferably removed prior to formation of the layer of electrically-conducting adhesion promoter, the composite electrode and/or the electrolyte. In this regard, removal of these inhibitors down to a level of less than 50 parts per million (ppm) can be accomplished by contacting these monomers and prepolymers with an inhibitor remover. Suitable inhibitor removers are commercially available.

An electrolytic cell is then formed using the current collector/electrode so formed. For example, if the electrode is a composite cathode, then the electrolytic cell is formed by combining the cathode with an anode and an electrolyte interposed therebetween.

Preferably, the electrolytic cell employs a solid, homogeneous, single-phase electrolyte which is maintained upon curing, and which does not readily separate upon cooling to temperatures below room temperature. See, for example, U.S. Pat. No. 4,925,751 which is incorporated herein by reference in its entirety. The solid, solvent-containing electrolyte is preferably prepared by combining a prepolymer with the inorganic ion salt and the electrolytic solvent to form an electrolyte solution. Optionally, a film forming agent such as a polyalkylene oxide film forming agent comprising repeating units of

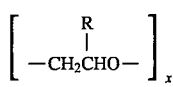

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000, can be incorporated into the electrolyte solution.

In a preferred embodiment, the resulting electrolyte solution comprises:

from about 40 to 80 weight percent electrolytic solvent based on the weight of the electrolyte solution, preferably from about 60 to 80 weight percent, and even more preferably from about 60 to 70 weight percent;

from about 5 to 30 weight percent of prepolymer based on the weight of the electrolyte solution, preferably from about 10 to 25 weight percent, and even more preferably from about 17 to 22 weight percent; and from about 5 to about 25 weight percent of the inorganic ion salt based on the weight of the electrolyte solution, preferably from about 7 to 15 weight percent, and even more preferably from about 8 to 13 weight percent.

When a polyalkylene oxide film forming agent is employed, it is preferably employed at from about 1 to 10 weight percent based on the weight of the electrolyte solution, more preferably from about 1 to 5 weight percent, and still more preferably from about 2.5 to 3.5 weight percent.

Also, when the electrolyte solution employs a polyalkylene oxide film forming agent, it is preferably mixed in the manner described hereinbelow in Example 1.

The resulting solution is preferably uniformly coated onto the cathode prepared as described above by means of a roller, a doctor blade, a bar coater, a silk screen or spinner to obtain a film of this solution over the cathode. However, other substrates can be used such as aluminum foil, glass plates, the lithium anode, etc.

In order to enhance its application of the electrolyte solution onto the cathode or other substrate, this solution is preferably a liquid and even more preferably has a viscosity of from about 500 to about 10,000 centipoise at 25° C. and still more preferably has a viscosity of from about 1000 to about 4000 centipoise at 25° C. In some cases, it may be necessary to heat the solution so as to reduce the viscosity of the solution thereby providing for a coatable material.

Preferably, the amount of electrolyte solution coated onto the substrate is an amount sufficient so that after curing, the resulting solid, solvent-containing electrolyte has a thickness of no more than about 250 microns (μm). Preferably, the solid, solvent-containing electrolyte has a thickness of from about 25 to about 250 microns, more preferably from about 50 to about 150 microns, and even more preferably from about 50 to about 80 microns.

The liquid electrolyte composition containing such prepolymers can be applied over a layer of cathode paste which itself is formed over a layer of electrically-conducting adhesion-promoter found on a metal foil. Both the cathode paste and the liquid electrolyte composition are cured simultaneously by exposure to, for example, electron beams so as to provide for a cured composite containing both the cured cathode and the cured electrolyte. Alternatively, the liquid electrolyte can be applied to the cured cathode and then itself cured in a step separate from the cathode curing step. The electrolyte composition is cured by conventional methods to form a solid, solvent-containing electrolyte.

In an alternative embodiment, the solid polymeric matrix (e.g., formed by polymerization of a prepolymer) can be dissolved into a suitable volatile solvent and the requisite amounts of the inorganic ion salt and electrolytic solvent are then added. The mixture is then applied onto a suitable substrate (e.g., the surface of the cathode opposite to the current collector) in the manner set forth above and the volatile solvent removed by conventional techniques (e.g., evaporation) to provide for a solid, single phase, electrolyte. Suitable volatile solvents preferably have a boiling point of less than 85° C. and more preferably from about 45° to less than 85° C. Particularly preferred volatile solvents are aprotic solvents. Examples of suitable volatile solvents include acetonitrile, tetrahydrofuran, and the like. However, acetonitrile is not preferred if it is to contact the anode.

In any event, the resulting electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

In a preferred embodiment, the lithium anode is then laminated onto the electrolyte so as to fabricate an electrolytic cell having an anode, a cathode and interposed therebetween, a solid, solvent-containing electrolyte.

Methods for preparing solid electrolytes and electrolytic cells are also set forth in U.S. Pat. Nos. 4,830,939 and 4,925,751 which are incorporated herein by reference in their entirety.

Utility

The electrically-conducting adhesion promoter of this invention is useful in enhancing the adherence of a composite electrode to the current collector of an electrolytic cell. Specifically, the electrically-conducting adhesion promoter is interposed between the composite electrode and the current collector.

The improved adherence of the metal foil to the composite electrode by the use of the electrically-conducting adhesion-promoter layer described herein is evidenced by the reduced rate at which the electrode paste separates from this layer during application as compared to the rate of separation arising from use of a metal foil without this layer. This improved adhesion of the electrode paste to the current collector by virtue of the interposed layer of electrically-conducting adhesion-promoter can be quantified as per ASTM test number D-3359-87.

Since this adhesion-layer is electrically-conducting, the current generated by the electrolytic cell can pass through it and be collected by the metal foil acting as the current collector.

When the layer of electrically-conducting adhesion-promoter is preferably non-cation conducting, then migration of alkali or alkaline earth metal cations to the current collector is prevented. This, in turn, prevents potentially adverse interaction of such cations with the current collector (e.g., corrosion) which could reduce the useful life of the electrolytic cell.

The following examples are offered to illustrate the present invention and should not be construed in any way as limiting its scope.

EXAMPLES

Example 1

This example demonstrates the feasibility of employing an electrically-conducting, adhesion promoter containing carbon powder and an adhesion-promoting polymer which is applied onto an aluminum substrate by means of electrostatic force.

Specifically, aluminum foil was attached to a piece of ordinary photocopy paper. The aluminum foil/copy paper composite was run through a photocopy machine (Xerox model 5012) so as to apply a layer of toner over the whole surface of the aluminum foil. The adhesion was moderate and the conductivity was fair to poor.

However, it is contemplated that by modifying the toner composition by including materials having a higher degree of conductivity and adhesion, a suitable electrically-conducting, adhesion-promoting layer on the surface of a metal foil would be formed. Such an adhesion-promoting layer would have the advantages of quick application, substantially uniform thickness and high reliability and reproducibility because the electrically-conducting, adhesion-promoting layer is formed through application of an electrostatic force as opposed to a paint or the like.

Example 2

This example illustrates how a solid electrolytic cell containing a solid electrolyte and an aluminum foil current collector containing an electrically conducting, adhesion-promoting layer as per this invention could be prepared.

Specifically, a solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as described in Example 1 above with the exception that the toner solution contains additional conductive material (e.g., carbon powder) so as to improve the conductivity of this layer.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

Alternatively, the solid components are first mixed together and then added to the solution comprising the liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electrocurtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous. The resulting solution is passed through a column of A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a] = weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolytic solvent and the $LiPF_6$ salt are filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8-12 Mesh from Schoofs Inc., Moraga, Calif.) and then proceed to step 4.

2. Dry the propylene carbonate and triglyme over sodiated 4A molecular sieves (Grade 4, 8-12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C.

8. After the final addition of the $LiPF_6$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C.

E. The Solid Electrolytic Cell

A sheet comprising a solid electrolytic cell is prepared by laminating the lithium foil anode to the surface of the electrolyte in the sheet produced in step C above. Lamination is accomplished by minimal pressure.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including the equivalents thereof.

What is claimed is:

1. A method for enhancing the adhesion of an electrode paste to a surface of a metal foil which method comprises: (1) applying a layer of an electrically-conducting adhesion-promoter comprising a carbon powder and an adhesion-promoting polymer onto at least one surface of the metal foil by means of an electrostatic flux sufficient to attract the electrically-conducting adhesion-promoter to the surface of the metal foil, wherein said adhesion-promoting polymer is selected from the group consisting of polyester, styrene/acrylate polymer, polyethylene, styrene/butadiene copolymer, ethylene/vinyl acetate copolymer, and polyisobutylene, (2) thereafter, applying the electrode paste onto the layer of electrically-conducting adhesive-promoter, and then (3) curing the electrode paste.

2. The method according to claim 1, wherein said carbon powder is selected from the group consisting of graphite, carbon black, acetylene black and furnace black.

3. The method according to claim 1, wherein the amount of said compatible adhesion-promoting polymer comprises from about 75 weight percent to about 95 weight percent based on the total weight of the carbon powder and said polymer.

4. The method according to claim 1, wherein the metal foil is aluminum foil.

5. The method according to claim 1, wherein the through-the-layer conductivity of the layer of electrically-conducting adhesion promoter is at least about 0.2 S cm$^{-2}$.

6. The method according to claim 1, wherein the thickness of the layer of electrically-conducting adhesion promoter is no greater than about 100 μm.

7. The method according to claim 6, wherein the thickness of the layer of electrically-conducting adhesion promoter ranges from about 100 Angstroms to about 20 μm.

8. The method according to claim 6, wherein the thickness of the layer of electrically-conducting adhesion promoter ranges from about 0.1 μm to about 10 μm.

9. The method according to claim 1, wherein said layer of electrically-conducting adhesion promoter is applied to the surface of the metal foil by means of an electrostatic force from a colloidal solution comprising a liquid vehicle, the carbon powder and the compatible adhesion-promoting polymer and further wherein, after application, the liquid vehicle is removed by evaporation.

10. A method for producing an electrode/current collector composite comprising:

(a) selecting a metal foil current collector;

(b) selecting an electrically-conducting adhesion-promoter comprising a carbon powder and an adhesion-promoting polymer;

(c) selecting a composite electrode selected from a composite anode and a composite cathode;

(d) electrostatically applying a layer of said electrically-conducting adhesion-promoter onto at least one surface of said current collector by means of an electrostatic flux sufficient to attract the electrically-conducting adhesion-promoter to the surface of the current collector; and (e) applying the composite electrode to the electrically-conducting adhesion-promoter layer on the current collector, to produce an electrode/current collector composite.

11. The method according to claim 10 wherein said adhesion-promoting polymer is selected from the group consisting of polyester, styrene/acrylate polymer, polyethylene, styrene/butadiene copolymer, ethylene/vinyl acetate copolymer, and polyisobutylene and wherein the composite cathode is formed from a cathode paste that comprises from about 1 to about 20 weight percent of a conductive material, from about 35 to about 60 weight percent of a compatible cathodic material, from about 10 to about 50 weight percent of an electrolytic solvent and from about 5 to 30 weight percent of a cathode prepolymer all based on the total weight of the paste, and further wherein the composite anode is formed from a anode paste that comprises from about 1 to about 20 weight percent of a conductive material, from about 35 to about 60 weight percent of a compatible anodic material, from about 10 to about 50 weight percent of an electrolytic solvent and from about 5 to about 30 weight percent of an anode prepolymer all based on the total weight of the paste.

12. The method according to claim 10, wherein said composite electrode is a composite cathode paste.

13. The method according to claim 10, wherein said composite electrode is a composite anode paste.

14. The method according to claim 10, wherein the metal foil is aluminum foil.

15. A method of preparing an electrolytic cell comprising (a) selecting a metal foil current collector;

(b) selecting an electrically-conducting adhesion-promoter comprising a carbon powder and an adhesion-promoting polymer;

(c) selecting a composite cathode;

(d) selecting a solid electrolyte;

(e) selecting and anode;

(f) electrostatically applying a layer of said electrically-conducting adhesion-promoter onto at least one surface of said current collector by means of an electrostatic flux sufficient to attract the electrically-conducting adhesion-promoter to the surface of the current collector;

(g) applying the composite cathode to the electrically-conducting adhesion-promoter layer on the current collector to form a cathode/current collector composite; and (h) producing the electrolytic cell by interposing the solid electrolyte between the cathode/current collector composite and the anode.

16. The method according to claim 10 wherein said adhesion-promoting polymer is selected from the group consisting of polyester, styrene/acrylate polymer, polyethylene, styrene/butadiene copolymer, ethylene/vinyl acetate copolymer, and polyisobutylene and wherein the composite cathode is formed from a cathode paste that comprises from about 1 to about 20 weight percent of a conductive material, from about 35 to about 60 weight percent of a compatible cathodic material, from about 10 to about 50 weight percent of an electrolytic solvent and from about 5 to 30 weight percent of a cathode prepolymer all based on the total weight of the paste.

17. The method according to claim 15, wherein the through-the-layer conductivity of the layer of electrically-conducting adhesion promoter is at least about 0.2 S cm$^{-2}$.

18. The method according to claim 15, wherein the thickness of the layer of electrically-conducting adhesion promoter is no greater than about 100 μm.

19. The method according to claim 18, wherein the thickness of the layer of electrically-conducting adhesion promoter ranges from about 100 Angstroms to about 20 μm.

20. The method according to claim 15, wherein the thickness of the layer of electrically-conducting adhesion promoter ranges from about 0.1 μm to about 10 μm.

21. The method according to claim 15, wherein said layer of electrically-conducting adhesion promoter is applied to the surface of the metal foil by means of an electrostatic force from a colloidal solution comprising a liquid vehicle, the carbon powder and the compatible adhesion-promoting polymer and further wherein, after application, the liquid vehicle is removed by evaporation.

* * * * *